US011626980B2

(12) United States Patent
Peddada et al.

(10) Patent No.: US 11,626,980 B2
(45) Date of Patent: *Apr. 11, 2023

(54) AUTHENTICATION USING KEY AGREEMENT

(71) Applicant: Salesforce, Inc., San Francisco, CA (US)

(72) Inventors: Prasad Peddada, Alameda, CA (US); Taher Elgamal, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/646,823

(22) Filed: Jan. 3, 2022

(65) Prior Publication Data

US 2022/0131688 A1 Apr. 28, 2022

Related U.S. Application Data

(63) Continuation of application No. 16/938,632, filed on Jul. 24, 2020, now Pat. No. 11,233,636.

(51) Int. Cl.
*H04L 9/08* (2006.01)
*H04L 9/32* (2006.01)
(Continued)

(52) U.S. Cl.
CPC .......... *H04L 9/0844* (2013.01); *G06F 16/182* (2019.01); *G06K 19/06037* (2013.01); *H04L 9/0894* (2013.01); *H04L 9/3066* (2013.01); *H04L 9/3247* (2013.01); *H04L 9/3271* (2013.01); *H04L 63/0435* (2013.01); *H04L 67/01* (2022.05)

(58) Field of Classification Search
CPC ... G06F 16/182; H04L 9/3066; H04L 9/0844; H04L 67/01; H04L 9/0894; H04L 9/0841; H04L 9/3271; H04L 9/3247; H04L 63/0435; G06K 19/06037
See application file for complete search history.

(56) References Cited

U.S. PATENT DOCUMENTS 8,719,952 B1 * 5/2014 Damm-Goossens ....................... H04L 9/3226 726/28
10,411,907 B2 * 9/2019 Peddada ............... H04L 9/3213
(Continued)

*Primary Examiner* — Mohammad A Siddiqi
(74) *Attorney, Agent, or Firm* — Holland & Hart LLP

(57) ABSTRACT

A client may transmit an authentication request to a server. The server may initiate a key agreement process using a short-lived private key generated at the server and a public key of the device, generate a shared secret, and derive a symmetric key. The symmetric key may be used to encrypt a random challenge. Further, the server initiates a key agreement process for the client using the partial private key that was generated for the client and the short-lived public key generated at the server. A partial key agreement result and the encrypted random challenge may be transmitted to the client. The client may complete the key agreement process using the partial key agreement result and a respective portion of the private key. The client may derive the encryption key and decrypt the random challenge. An indication of the random challenge may be transmitted to the server, which authenticates the client.

20 Claims, 10 Drawing Sheets

(51) Int. Cl.
*H04L 9/30* (2006.01)
*H04L 67/01* (2022.01)
*G06F 16/182* (2019.01)
*G06K 19/06* (2006.01)
*H04L 9/40* (2022.01)

(56) References Cited

U.S. PATENT DOCUMENTS

| | | | |
|---|---|---|---|
| 10,476,855 B1* | 11/2019 | Peddada | H04L 63/061 |
| 2007/0258585 A1* | 11/2007 | Sandhu | H04L 9/302 |
| | | | 380/44 |
| 2008/0077592 A1* | 3/2008 | Brodie | H04L 63/08 |
| | | | 707/999.009 |
| 2012/0204032 A1* | 8/2012 | Wilkins | H04L 63/0428 |
| | | | 713/170 |
| 2016/0080157 A1* | 3/2016 | Lundström | H04L 63/126 |
| | | | 713/176 |
| 2016/0226846 A1* | 8/2016 | Fu | H04L 63/062 |
| 2021/0176255 A1* | 6/2021 | Hill | H04L 9/3234 |

* cited by examiner

AUTHENTICATION USING KEY AGREEMENT

CROSS REFERENCES

The present application for patent is a continuation of U.S. patent application Ser. No. 16/938,632 by Peddada et al., entitled "AUTHENTICATION USING KEY AGREEMENT," filed Jul. 24, 2020; assigned to the assignee hereof and expressly incorporated by reference herein.

FIELD OF TECHNOLOGY

The present disclosure relates generally to database systems and data processing, and more specifically to authentication using key agreement.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Cryptographic keys are used in a variety of applications, including user authentication. In some examples, a key may be used to authenticate a user to a system. If that key is compromised, then the user data may be compromised. For example, a compromised key may be used to a party to access user data via an application.

DETAILED DESCRIPTION

Figure 1:
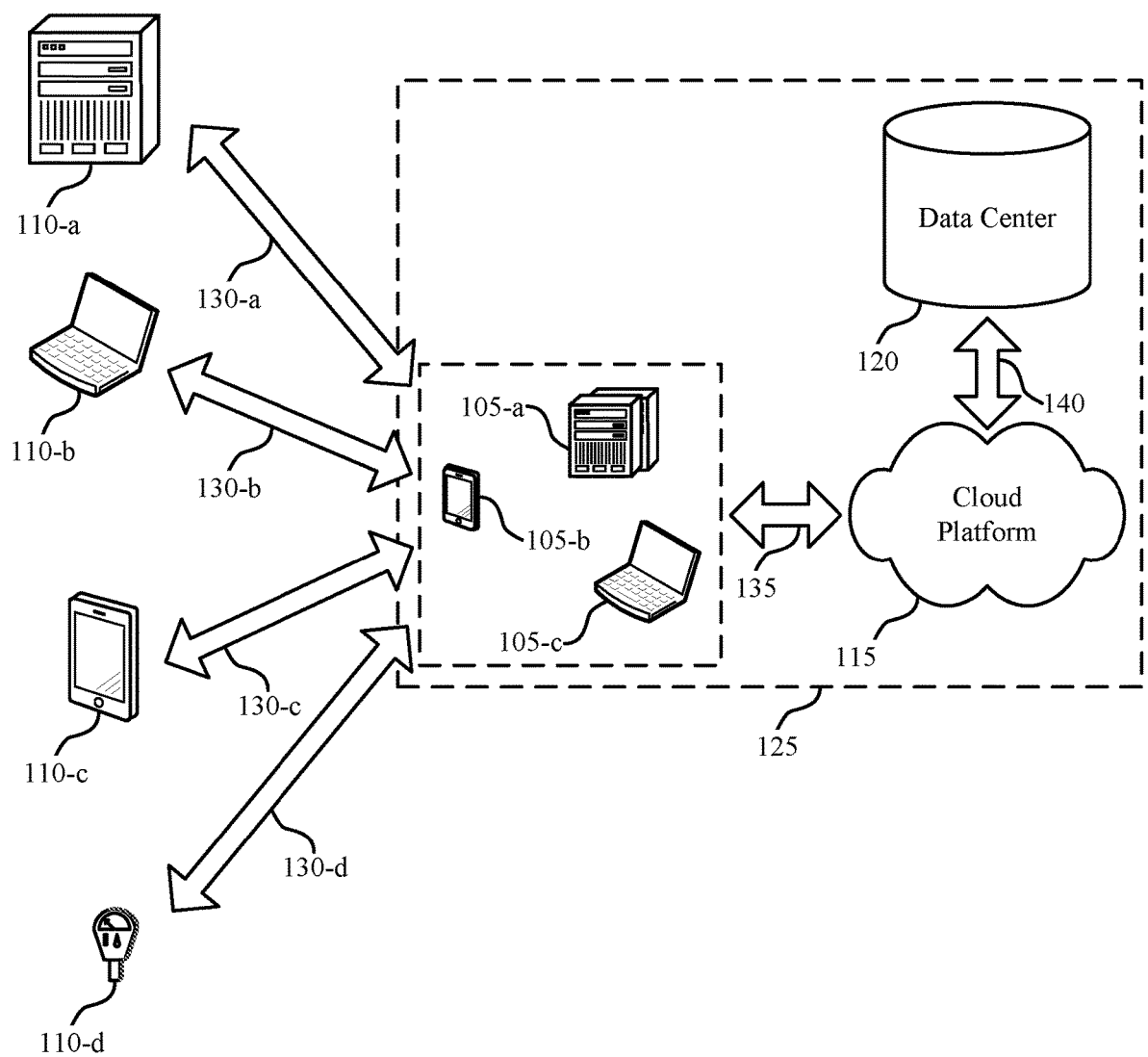
FIG. 1 illustrates an example of a system for authentication of a client that supports authentication using key agreement in accordance with aspects of the present disclosure.

Cryptographic keys are used in a variety of applications, including user authentication. In some examples, a key may be used to authenticate a user to a system. If that key is compromised, then the user data may be compromised. For example, a compromised key may be used to a party to access user data via an application.

Implementations described herein leverage key agreement protocols to perform authentication of a client at a server. A client device, such as a mobile device executing an application, may request access to a server (e.g., a server supporting the application). The access request may correspond to an account request. In response to the login request, the server may generate an asymmetric key pair, which includes a public key and a private key. The server may split the private key and store a first portion of the private key at the server. The second portion of the private key may be transmitted to the client device. The client device may split the second portion into two sub-portions, where a first sub-portion is known to the user and a second sub-portion is stored at the device. This may complete a client provisioning process.

When the client attempts to login, the server may initiate a key agreement process using a short-lived private key generated at the server and the public key of the device, generate a shared secret, and derive a symmetric key using the shared secret. The symmetric key may be used to encrypt a random challenge. Further, the server initiates a key agreement process for the client using the partial private key that was generated for the client and the short-lived public key generated at the server. A partial key agreement result and the encrypted random challenge may be transmitted to the client. The client may complete the key agreement process using the partial key agreement result and the two sub-portions of the private key, which may result in the shared secret. The shared secret may then be used to derive the same encryption key, which is used to decrypt the random challenge. An indication of the random challenge may be transmitted to the server, which authenticates the client.

In some examples, the asymmetric key pair may be generated using an elliptic curve process. Further, the key agreement process may utilize the Elliptic-Curve Diffie-Hellman (ECDH) protocol to derive the shared secret. Thus, leveraging this cryptographic protocol, a client may store a portion of the key to be used to derive the key to decrypt the random challenge. This may result in more secure application and client authentication.

Aspects of the disclosure are initially described in the context of an environment supporting an on-demand database service. Aspects of the disclosure are further described with respect to a general system diagram, a specific system diagram, and a process flow diagram. Aspects of the disclosure are further illustrated by and described with reference to apparatus diagrams, system diagrams, and flowcharts that relate to authentication using key agreement.

FIG. 1 illustrates an example of a system 100 for cloud computing that supports authentication using key agreement in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

An application server may support an application that may execute on user devices. The application may need to authenticate with the server before the application and user are able to access various services. In some cases, authentication keys or access tokens may be used for access. However, key management may be complex and subject to man in the middle attacks, in which an unauthorized party may gain access to a key and access user data and services supported by the application.

The cloud platform 115 may support authentication based on key agreement. The implementations are described with respect to application and user authentication, but it should be understood that the implementations described herein may be applicable in other scenarios. The cloud platform 115 may support an application server that supports applications that may be executed on devices of cloud clients 105 and/or contacts 110. In some cases, the application server that supports these implementations may be used by the cloud clients 105 to authenticate contacts 110. When a device initially requests access to the application server, the application server may generate an asymmetric key pair that includes a private key and a public key. The private key may be split into two portions, and a first portion may be stored at the server. The second portion of the split private key may be shared with the device (e.g., the cloud client 105 or the contact 110). In some cases, the second portion may be further split into sub-portions, one of which may be known to the user and the other stored at the device. This process may be referred to as client provisioning.

Thereafter, when the user wants to login to the application system, the server may generate, in response to a request from the client, a new short-lived asymmetric key pair that includes a short-lived private key and a short-lived public key. This may be a temporary asymmetric key pair used for this particular instance of a login. The short-lived private key and the public key associated with the client (previously generated) may be used to generate a shared secret (e.g., using ECDH protocols). The shared secret may be used to derive a symmetric key that is used to encrypt a random challenge. Further, the server may initiate the key agreement process for the client using the portion of the split private key that is stored at the server and the short-lived public key. A partial key agreement result and the encrypted random challenge may be digitally signed and transmitted to the client.

The client receives the signed encrypted random challenge and the partial agreement result and verifies the signature (e.g., using a public key associated with the server). Upon verification, the client may complete the key agreement using the portion of the private key at the client. This may include receiving the sub-portion from the user (e.g., a pin) and using both sub-portions, as well as the public key of the client, to generate the shared secret. Because of the cryptographic protocols used to generate the asymmetric keys, the server and the client may generate the same shared secret. That is, as the server generates the shared secret using the public key of the client and the short-lived private key, and the client generates the shared secret using the private key (using partial key agreement at the server) of the device and the short-lived public key that was generated at server, the shared secrets are the same. Thus, the client may derive the same symmetric key (e.g., using the same key derivation function) and decrypt the random challenge. The client may indicate a result of decrypting the random challenge to the server. The server may authenticate the client based on the indication of the random challenge. Thus, using this process, not a single party (e.g., client or server) stores the entire private key that is used to derive the shared secret. Since user devices (e.g., smart phones, laptops) may be subject to theft, the storage of a portion (e.g., sub-portion) of the private key may prevent unauthorized access to the server. Further, these described techniques may prevent or limit the use of passwords to access secure systems. Thus, rather than a user entering a passwords, these techniques may be used to authenticate a user and a device.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

For example, a cloud client 105 may be supported by a server of the cloud platform 115. A user, such as a contact 110, may download the application to a user device, such as a smart phone. Upon downloading the application or an initial opening of the application at the user device, the server may transmit a partial private key to the device. The application may request that the user input a pin, which may function as a sub-portion of the private key. The other sub-portion (minus the pin) may be securely stored at the user device. Upon logging into the application, the application may transmit a request to the server, and the server may respond with a payload that includes an encrypted random challenge and a partial key agreement result. The application may request that the user input the pin and use the sub-portion of the private key corresponding to the pin and the other sub-portion that is stored at the device to complete the key agreement to generate a shared secret. The shared secret may be used to derive an encryption key to decrypt the random challenge. The application may send an indication of the decrypted random challenge to the server, and the server may authenticate the user device to access the services of the application supported by the server.

Figure 2:
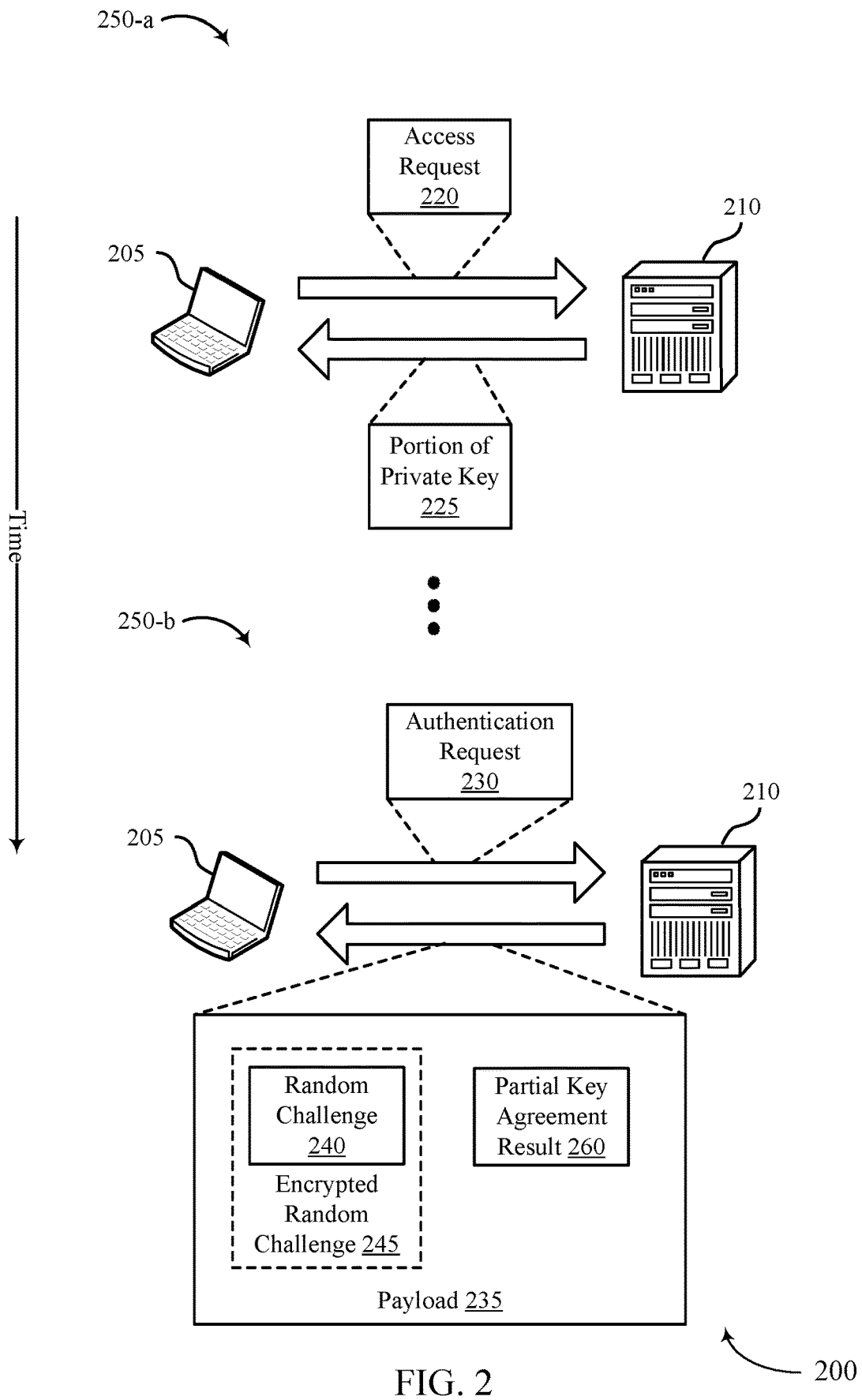
FIG. 2 illustrates an example of a system that supports authentication using key agreement in accordance with aspects of the present disclosure.

FIG. 2 illustrates an example of a system 200 that supports authentication using key agreement in accordance with aspects of the present disclosure. The system 200 includes a client 205 and a server 210. The server 210 may be an example of aspects of the cloud platform of FIG. 1. For example, the server 210 may be an example of an application server. The client 205 may correspond to a client device, such as a laptop, desktop, smart phone, tablet, or other type of client system. At 250-a, a user of the client 205 may download an application supported by the implementations described herein.

Upon downloading, execution, etc., of the application, the client 205 may transmit an access request 220 to the server 210. In response, the server 210 may generate an asymmetric key pair that includes a private key and a public key. The private key may be split into a first portion and a second portion. The first portion may be stored at the server, and the second portion of the private key 225 may be indicated to the client 205. In one example, the portion may be displayed at the device (e.g., a QR code may be generated and displayed, which may be scanned by the client 205). In another example, the portion of the private key 225 may be transmitted using a secure communication channel, email, text message, or the like.

The client 205 or an application of the client 205 may further split the portion of the private key 225 into sub-portions. In one example, the user of the client 205 is asked to input a pin. Based on the pin and a sub-portion, the client 205 may identify an operator/operation (addition, multiplication, etc.) that may be used, in conjunction with the pin, to generate the sub-portion. For example, a sub-portion of the portion of the private key 225 may have a value of 1000. The user may input a pin of 1234. Thus, an operator, such as (minus 234) may be identified such that input of the pin results in the portion (e.g., 1234−234=1000). The other sub-portion of the portion of the private key 225 may be securely stored at the client 205. This process may complete a provisioning portion, at 250-a, of the implementations described herein.

Subsequently, when a user wants to authenticate to the server 210 via the client 205 at 250-b, the user may open the application at the client 205. In response, the application may transmit an authentication request 230 to the server 210. The server 210 may generate a new short-lived asymmetric key pair that includes a short-lived public key and a short-lived private key. This short-lived asymmetric key pair may be an example of a one-time use key pair, as the private key may be discarded after these operations. The short-lived private key and the public key that was generated during the provisioning process may be used to generate a shared secret (e.g., using a key agreement protocol). The shared secret may be input into a key derivation function that outputs a symmetric key. The symmetric key may then be used to encrypt a random challenge 240 (e.g., a random value) resulting in encrypted random challenge 245. Thereafter, the private key may be erased.

Further, the server 210 may identify the partial private key that corresponds to the client 205. Using the partial private key and the short-lived public key of the asymmetric key (e.g., the one-time use key), the server 210 performs a partial agreement process, which outputs a partial key agreement result 260. The encrypted random challenge 245 and the partial key agreement result 260 may be transmitted to the client 205 as a payload 235. In some cases, the payload 235, or some portion thereof, may be digitally signed using a signing private key of the server 210.

The client 205 receives the payload 235 and may verify the digital signature (e.g., using a signing public key of the server 210). If the payload 235 is verified, the client 205 may then prompt for the user's pin. The user may input the pin (e.g., 1234) and the client 205 may derive the corresponding sub-portion of the portion of the private key 225. For example, based on the determined operation described above, the client 205 may subtract the value 234 from the pin to derive the sub-portion of the portion of the private key

225 (e.g., 1234-234=1000). The resulting value is combined with the portion of the private key that is stored at the client, which results in the portion of the private key 225. The portion of the private key 225 is used to complete the key agreement process using the partial key agreement result 260. This may result in the shared secret that was derived by the server using the client public key and the server private key. Thus, this shared secret is input into a key derivation function to derive the symmetric key that may be used to decrypt the encrypted random challenge 240. The client 205 may then transmit an indication of the random challenge 240 to the server 210, and the server 210 may authenticate the client 205 to access data, systems, and services.

In some cases, the server 210 may also indicate a blinding challenge such as to verify the client 205. This blinding challenge may be included in the payload 235. This blinding challenge may be used to prevent another client trying to login to the server 210 at the same time as client 205. For example, the user may enter the username that causes the authentication request 230 (e.g., the login request). In response, the server 210 may transmit an indication of the blinding challenge to the user (e.g., via text, email, or some other communications means to a identifier associated with the user). The user may verify that user is trying to login by indicating the random number using the user interface at the client 205. Thus, if another client tries to login using the username of the user, the actual user may be notified of the random blinding challenge and deny the request. The blinding challenge may be an example of a random number, a captcha, a picture selection, or the like.

Figure 3:
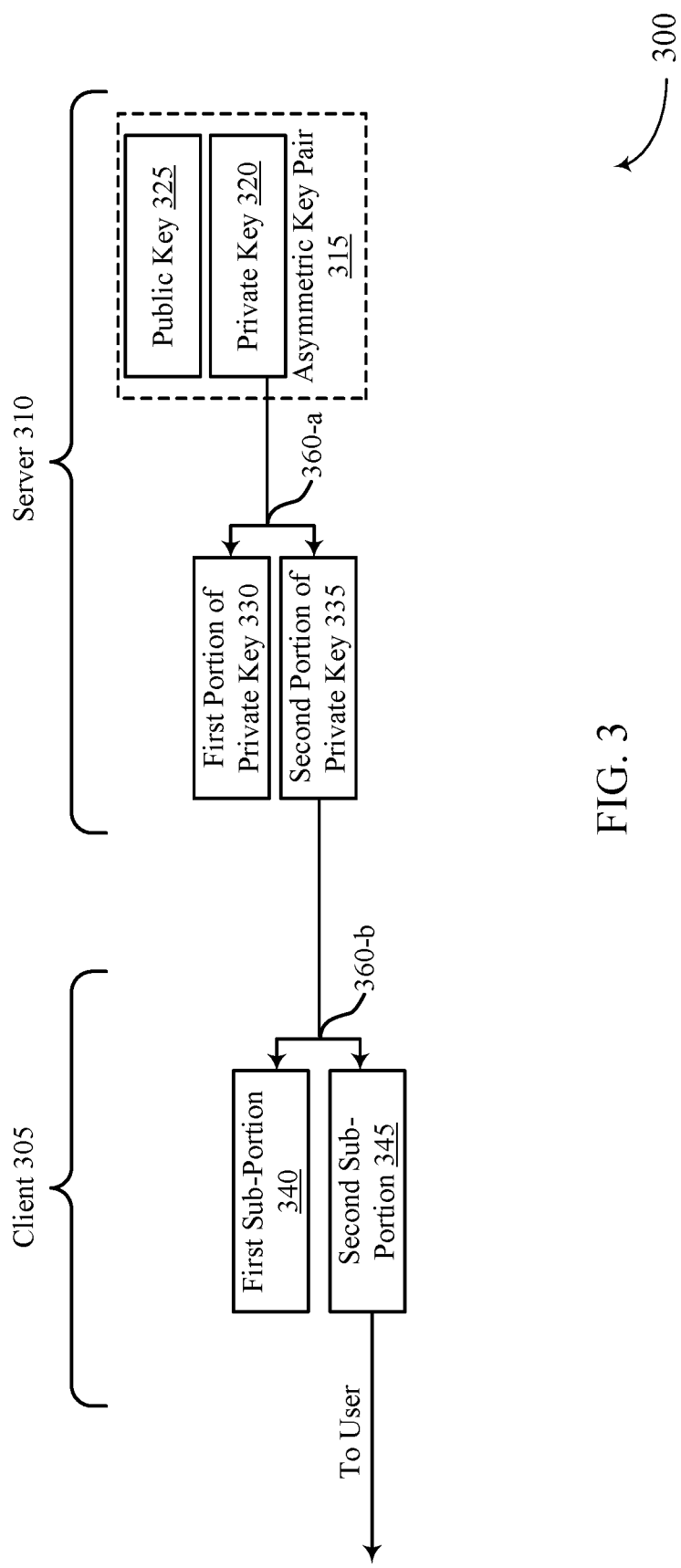
FIG. 3 illustrates an example of a system that supports authentication using key agreement in accordance with aspects of the present disclosure.

FIG. 3 illustrates an example of a system 300 that supports authentication using key agreement in accordance with aspects of the present disclosure. The system 300 includes a client 305 and a server 310, which may be examples of the corresponding devices as described with respect to FIGS. 1 and 2. Specifically, the system 300 illustrates a client provisioning process that supports authentication using key agreement in accordance with implementations described herein.

A user of client 305 may sign up for an account using a device application, such as a mobile device application, web application, or the like. In response to a user signup, the server 310 may generate an asymmetric key pair 315 that includes a public key 325 and a private key 320. In some cases, the asymmetric key pair 315 is generated using elliptic curve cryptography principles, and the key pair 315 may be referred to as an elliptic curve key pair. The server 310 may include a hardware security module (HSM). The HSM may be an example of a physical secure hardware system, such as a chipset, or a logical or virtual security system. The HSM may support digital key derivation, encryption, decryption, digital signatures, authentication, and other cryptographic functions.

The server 310 (e.g., the HSM of the server) may split the private key 320 using a key splitting function at 360-*a*. The key may be split in accordance with multi-party computation principles. They key splitting may result in a first portion of the private key 330 and a second portion of the private key 335, which is transmitted to the client 305. The first portion of the private key 330 may be securely stored at a data store of the server 310. The key splitting and distribution may be referred to secret sharing, in some examples. Various types of secure secret sharing protocols and algorithms may be used.

Transmission of the second portion of the private key 335 to the client 305 may be supported using various techniques. In accordance with one technique, a QR code may be displayed at or by a computing display. A user may scan or read the QR code using the mobile device. In another case, the second portion of the private key 335 is transmitted to the application over a secure channel, transmitted via email, text message, or the like. Various other techniques for transmitting to the second portion of the private key 335 are contemplated within the scope of this disclosure.

At the client 305, in some examples, the second portion of the private key 335 may be stored in memory for subsequent authentication. In other examples, as illustrated in FIG. 3, the second portion of the private key 335 is further split, using a key splitting function 360-*b*, into two sub portions, including a first sub-portion 340 and a second sub portion 345. This splitting process may include displaying a portion (e.g., a pin) to the user, and the pin may correspond to the second sub-portion 345. In other cases, the user is prompted to enter a pin, and an operator/operation is generated based on the entered pin. Thereafter, the user may enter the pin and the client may perform the operation, which may result in the second sub-portion 345. The first sub-portion 340 may be securely stored at the client 305 in association with the application. Thus, the second portion of the private key 335 may be distributed amongst the device and the user, which may further enhance security in the implementations described herein. Thereafter, during a login/authentication process, the second portion of the private key 335 may be utilized by the client 305 to authenticate at the server 310 by completing a key agreement process and decrypting a random challenge using a derived symmetric key. This process is further described with respect to FIG. 4.

Figure 4:
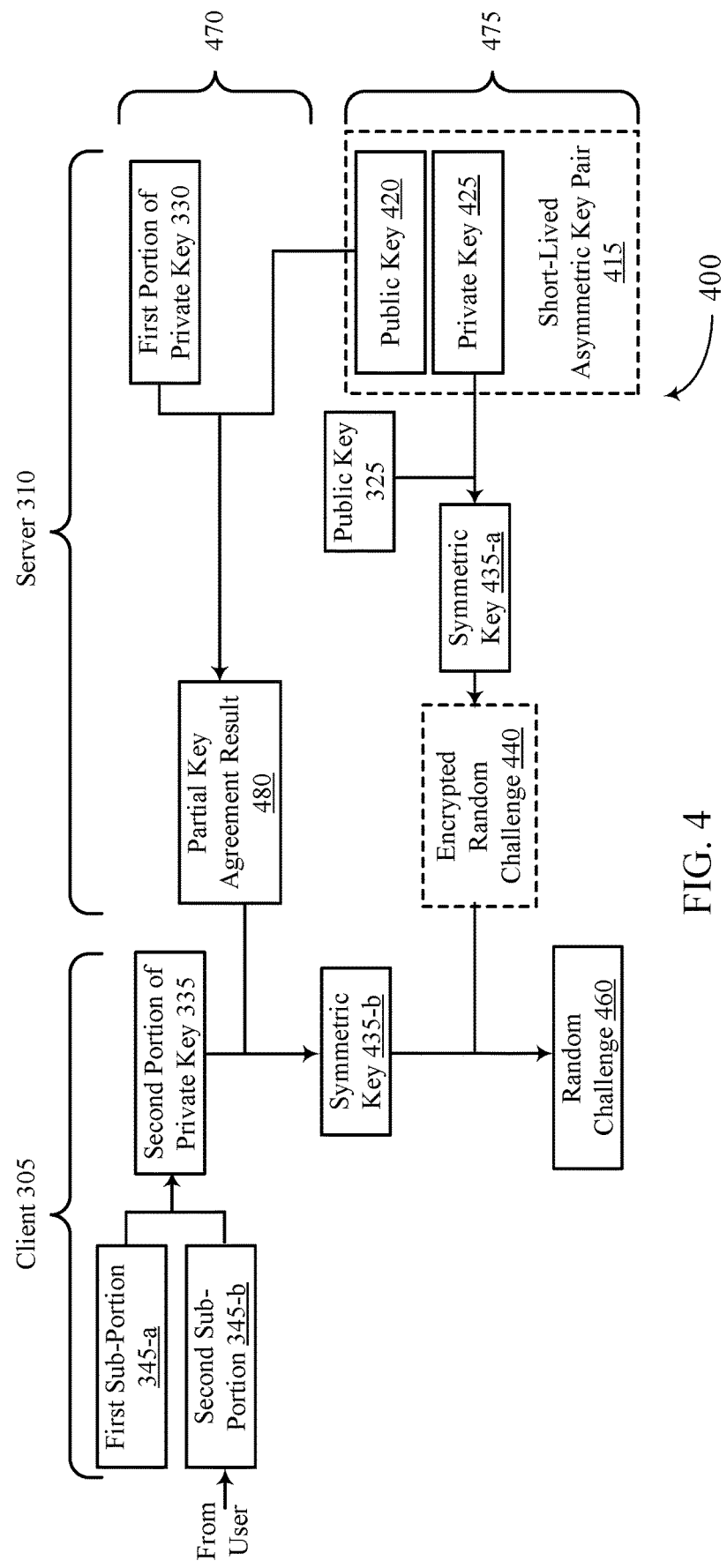
FIG. 4 illustrates an example of a system that supports authentication using key agreement in accordance with aspects of the present disclosure.

FIG. 4 illustrates an example of a system 400 that supports authentication using key agreement in accordance with aspects of the present disclosure. The system includes a client 305 and a server 310, which may be examples of the corresponding devices as described with respect to FIGS. 1 to 3. As illustrated in FIG. 3, the client 305 is provisioned with a second portion of a private key 335, while a first portion of the private key 330 is stored at the server 310. In FIG. 4, the authentication process is illustrated.

When a user attempts to login at the client 305, the client 305 may transmit a login request to the server 310. In response the server performs a first process 470 and a second process 475. The server may generate short-lived asymmetric key pair 415 in response to the login request. The short-lived asymmetric key pair 415 includes a public key 420 (e.g., short-lived public key) and a private key 425 (e.g., short-lived private key). This asymmetric key pair may be a temporary key pair, as it may be used for this particular login instance. As such, when the user subsequently performs a subsequent login, another short-lived asymmetric key pair 415 may be generated. Further, since the short-lived private key 425 is erased after utilization, the public key 420 may not be used for any authentication purposes. In accordance with the first process 470, the server 310 begins a key agreement process that is to be completed by the client. Using the first portion of the private key 330 that is stored at the server, and the public key 420 (e.g., a public key that is associated with the private key 425), the server 310 performs key agreement (e.g., using a ECDH protocol), which may result in a partial key agreement result 480. At this point, the partial key agreement result 480 may not be utilized for any authentication purposes since the second portion of the private key 335 is stored at the client 305 and has not been used to complete the key agreement process.

In accordance with the second process 475, the private key 425 of the asymmetric key pair and a public key 325 are used to generate a shared secret, then derive a symmetric key 435-a based on the shared secret. It should be noted that the public key 325 is the public key that is associated with the private key 320 of FIG. 3 that was split into the first portion of the private key 330 and the second portion of the private key 335 during the client provisioning process of FIG. 3. The derived symmetric key 435-a is used to encrypt a random challenge 440 (e.g., a random number) resulting in encrypted random challenge 440. The private key 425 may be erased from memory of the server.

The result of the first process 470, which is the partial key agreement result 480, and the result of the second process 475, which is the encrypted random challenge 440 may be transmitted to the client 305 as part of a payload (e.g., a payload 235 of FIG. 2). In some cases, the payload, or some portion thereof, may be digitally signed using a signing private key associated with the server.

The client 305 receives the payload. In some cases, the client 305 may verify the digital signature of the payload using a signing public key of the server, which may be typically included in a digital certificate. Further, if the second portion of the private key 335 is split into subportions 345-a and 345-b, the client 305 may prompt for the second sub-portion (or a corresponding pin) from the user. Using the first sub-portion 345-a and the second sub-portion 345-b, the client 305 may generate the second portion of the private key 335. Using the partial key agreement result 480 and the second portion of the private key 335, the client 305 performs or completes the key agreement process, which may result in a shared secret (which may be the same shared secret used to derive the symmetric key 435-a at the server according to key agreement protocols). Using the shared secret, the client 305 may derive the symmetric key 435-b, which may be the same symmetric key 435-a. Thus, the client may decrypt the encrypted random challenge 440 using the symmetric key 435-b, resulting in random challenge 460. This random challenge 460 may be indicated to the server 310, and the server 310 may authenticate the client 305.

The key derivation function (KDF) that is used to derive the symmetric key 435 may be agreed upon between the client 305 and the server 310. The KDF may be one of many key derivation functions. For example, the KDF may be an example of an advanced encryption standard (AES) function, a Galois/Counter mode (GCM) protocol, or the like.

Figure 5:
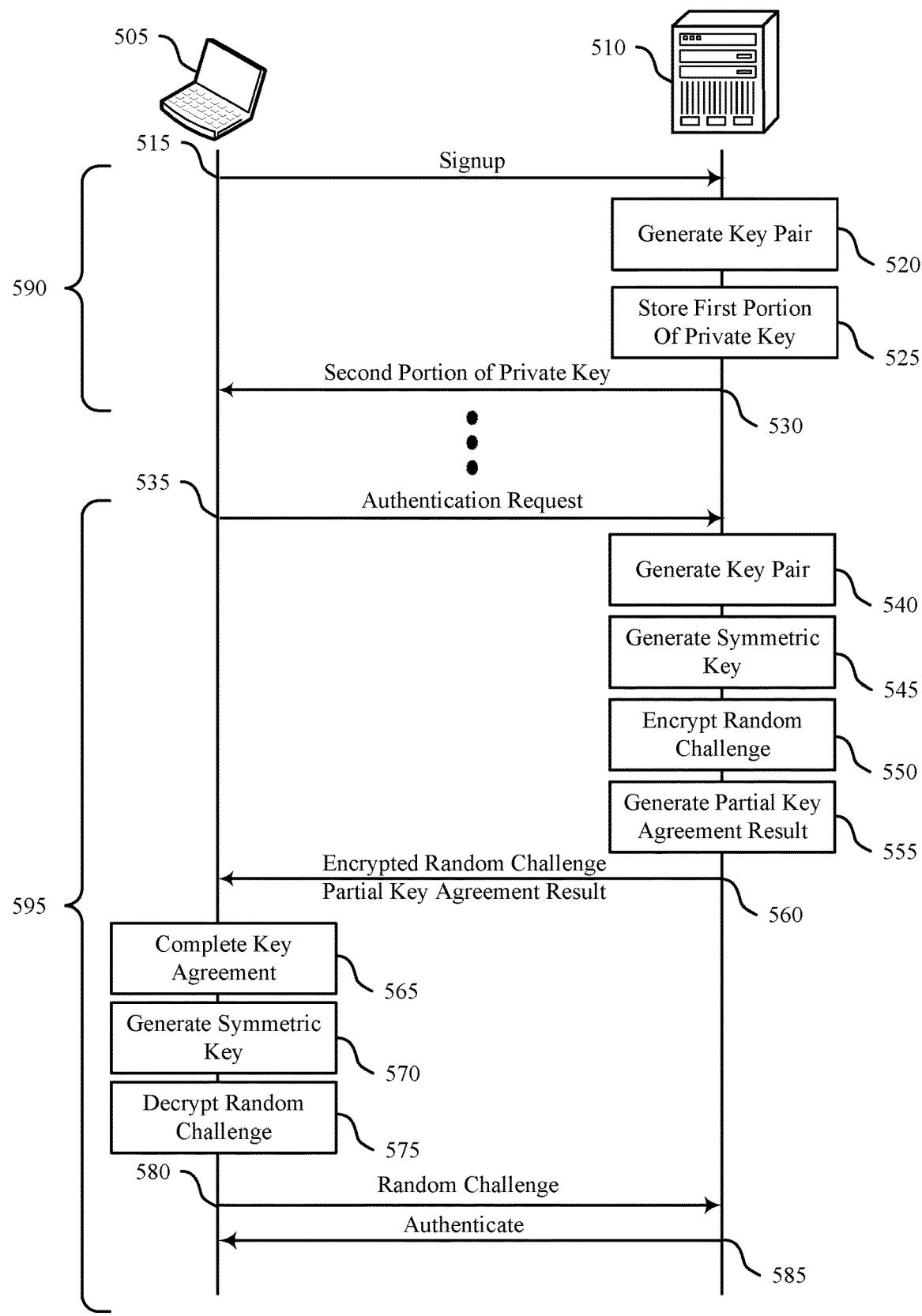
FIG. 5 illustrates a process flow diagram that supports authentication using key agreement in accordance with aspects of the present disclosure.

FIG. 5 shows a process flow diagram 500 that supports authentication using key agreement in accordance with aspects of the present disclosure. The process flow diagram includes a client 505 and a server 510, which may be examples of the corresponding devices as described with respect to FIGS. 1 through 4.

At 515, the client 505 may transit a signup request to the server. The signup request may also be referred to as an access request. In some examples, the signup request is transmitted in response to a user opening an application downloaded to the client 505. The client may be associated with a client public key.

At 520, the server 510 may generate an asymmetric key pair that includes a public key and a private key. The public key may be stored at the server 510.

At 525, the server 510 may store a first portion of the private key. That is, the server 510 may split the private key into a first portion and a second portion using multi-party computation principles.

At 530, the server 510 may transit a second portion of the private key to the client 505. Operations at 515, 520, and 525 may correspond to a client provisioning process 590.

Subsequently, at 535, the server 510 may receive, from the client 505, an authentication request. The authentication request may correspond to a login at the client 505.

At 540, the server 510 may generate, in response to receiving the authentication request, a short-lived asymmetric key pair. The asymmetric key pair may be generated using an elliptic curve process.

At 545, the server 510 may generate, based at least in part on receiving the authentication request, a symmetric key using the client public key and a short-lived private key of the short-lived asymmetric key pair. To generate the symmetric key, the server 510 may perform a key agreement process that may result in a shared secret, and the shared secret may be used to derive the symmetric key.

At 550, the server 510 may encrypt a random challenge using the generated symmetric key. The random challenge may use challenge-response authentication techniques. For example, the random challenge may be a random set of characters. The server 510 and the client 505 may have previously agreed on some process or algorithm to identify a response to the random set of characters.

At 555, the server 510 may generate a partial key agreement result using a first portion of a split private key. The partial key agreement result may also utilize the short-lived public key that was generated at the server. The key agreement process may be based on the ECDH protocol At 560, the server 510 may transmit the encrypted random challenge and the partial key agreement result to the client 505.

At 565, the client 505 may complete the key agreement process using the second portion of the private key and the key agreement result. Completion of the key agreement may also utilize the public key that was generated during the client provisioning process. In some examples, before completing the key agreement, the client 505 may verify a digital signature of the server 510.

At 570, the client 505 may generate the symmetric key based on shared secret that is the result of completing the key agreement at 565. The symmetric key may be generated using a key derivation function.

At 575, the client 505 may decrypt the random challenge that is received from the server 510 using the derived symmetric key. At 580, the server 510 may receive an indication of the decrypted random challenge. In some examples, this may include receiving a response to the random challenge that is derived based on an agreed upon process or algorithm. As noted herein, the server 510 and the client 505 may have previously agreed on some process or algorithm to identify a response to the random set of characters. For example, the random challenge may be a set of random characters, and the response to the random challenge may be some transformation (based on the agreed upon algorithm) of those random characters.

At 585, the server 510 may authenticate the client 505 based at least in part on receiving an indication of successful decryption of the random challenge by the client. Operations 535 to 585 may correspond to an authentication process 595.

Figure 6:
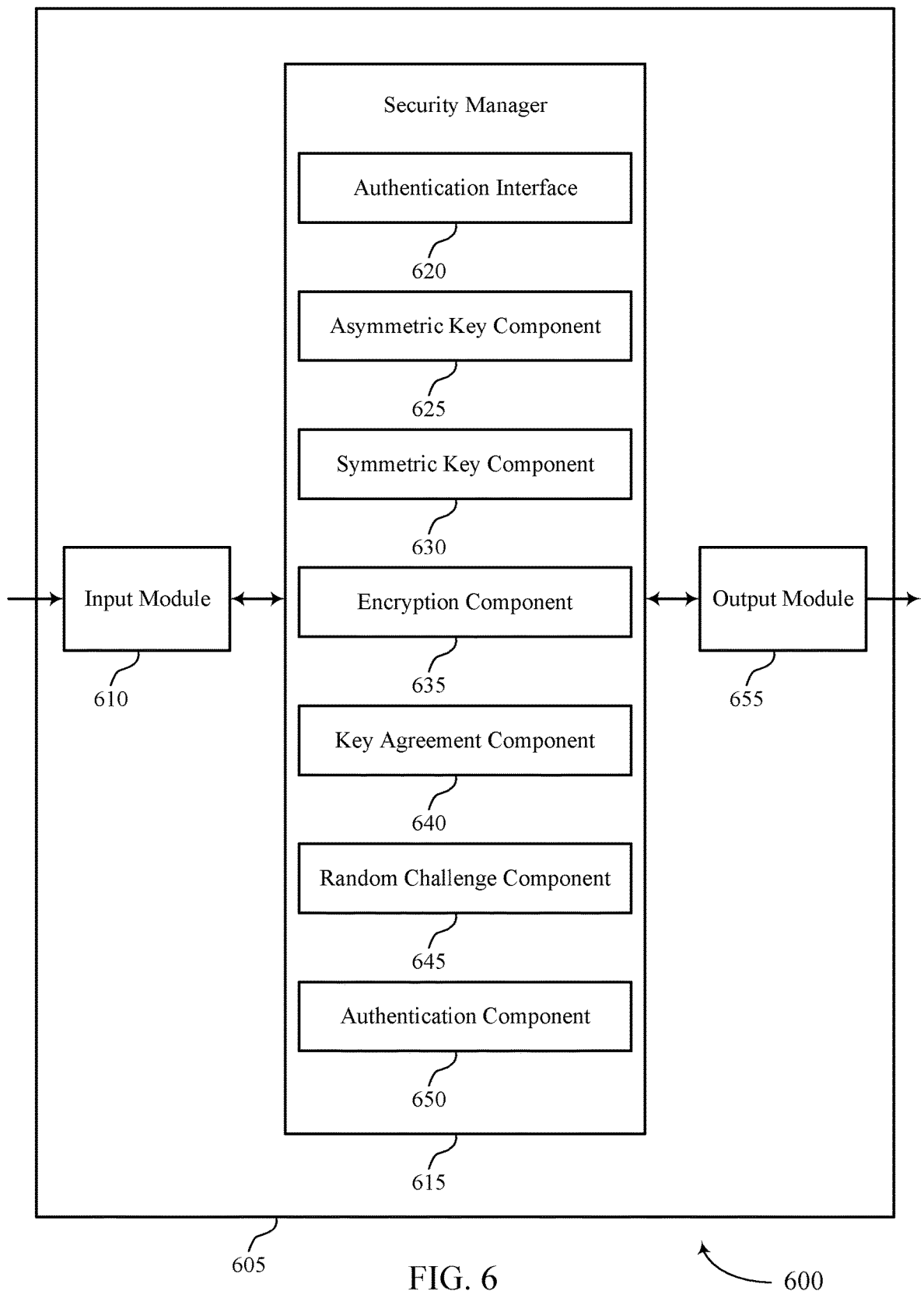
FIG. 6 shows a block diagram of an apparatus that supports authentication using key agreement in accordance with aspects of the present disclosure.

FIG. 6 shows a block diagram 600 of an apparatus 605 that supports authentication using key agreement in accordance with aspects of the present disclosure. The apparatus 605 may include an input module 610, a security manager 615, and an output module 655. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the security manager 615 to aspects of the present disclosure. In some cases, the input module 610 may be a component of an input/output (I/O) controller 815 as described with reference to FIG. 8.

The security manager 615 may include an authentication interface 620, an asymmetric key component 625, a symmetric key component 630, an encryption component 635, a key agreement component 640, a random challenge component 645, and an authentication component 650. The security manager 615 may be an example of aspects of the security manager 705 or 810 described with reference to FIGS. 7 and 8.

The security manager 615 and/or at least some of its various sub-components may be implemented in hardware, software executed by a processor, firmware, or any combination thereof. If implemented in software executed by a processor, the functions of the security manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The security manager 615 and/or at least some of its various sub-components may be physically located at various positions, including being distributed such that portions of functions are implemented at different physical locations by one or more physical devices. In some examples, the security manager 615 and/or at least some of its various sub-components may be a separate and distinct component in accordance with various aspects of the present disclosure. In other examples, the security manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The authentication interface 620 may receive, at the server and from the client, an authentication request.

The asymmetric key component 625 may generate, in response to receiving the authentication request, a short-lived asymmetric key pair on the server, the client being associated with a client public key.

The symmetric key component 630 may generate, based on receiving the authentication request, a symmetric key using the client public key and a short-lived private key of the short-lived asymmetric key pair.

The encryption component 635 may encrypt a random challenge using the symmetric key.

The key agreement component 640 may generate a partial key agreement result using a first portion of a split private key, the server having transmitted a second portion of the split private key to the client, the split private key being associated with the client public key.

The random challenge component 645 may transmit the encrypted random challenge and the partial key agreement result to the client, where the client is configured to derive the symmetric key for decrypting the random challenge using the partial key agreement result.

The authentication component 650 may authenticate the client based on receiving an indication of successful decryption of the random challenge by the client.

The output module 655 may manage output signals for the apparatus 605. For example, the output module 655 may receive signals from other components of the apparatus 605, such as the data retention module 615, and may transmit these signals to other components or devices. In some specific examples, the output module 655 may transmit output signals for display in a user interface, for storage in a database or data store, for further processing at a server or server cluster, or for any other processes at any number of devices or systems. In some cases, the output module 655 may be a component of an I/O controller 815 as described with reference to FIG. 8.

Figure 7:
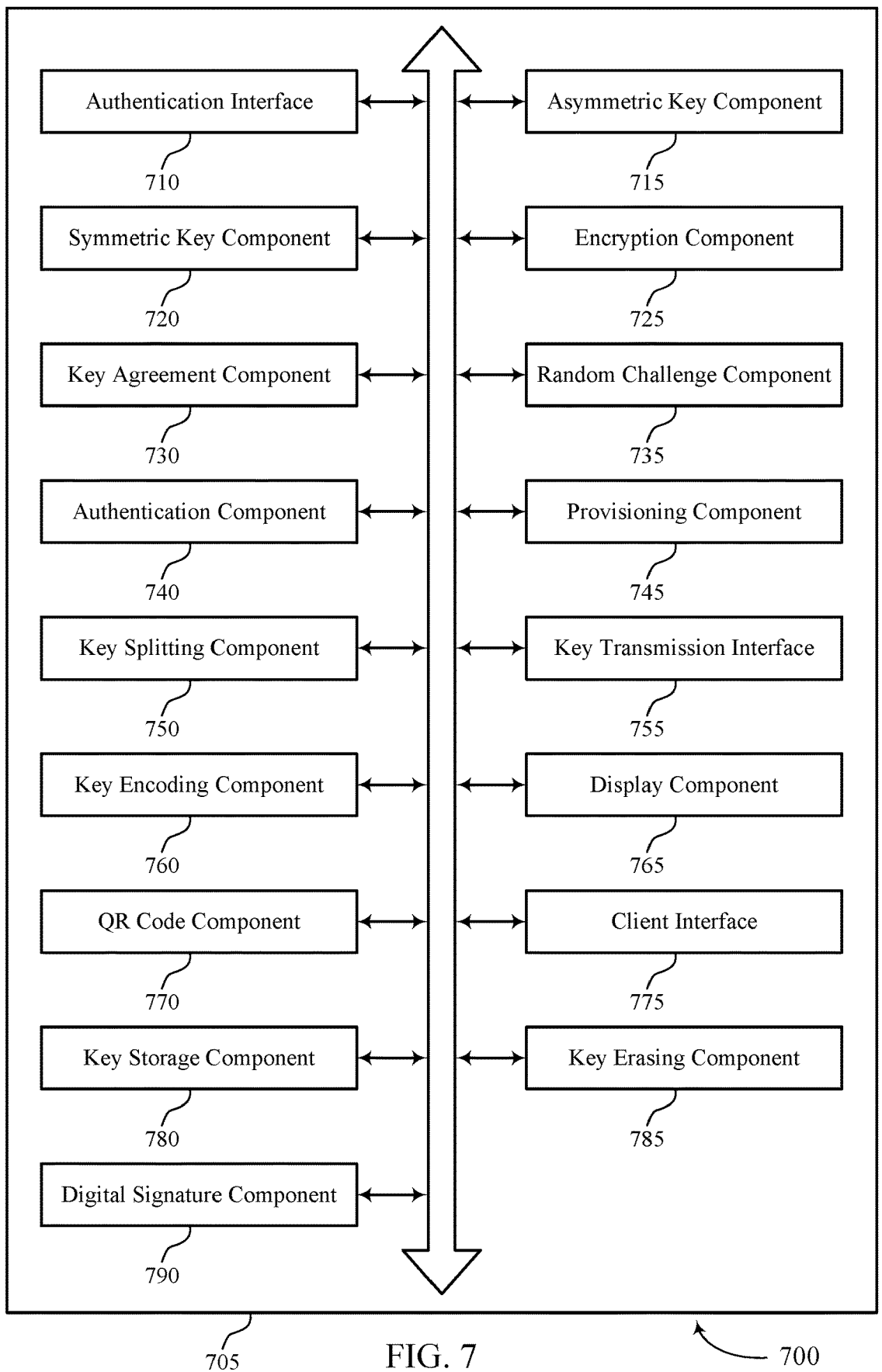
FIG. 7 shows a block diagram of a security manager that supports authentication using key agreement in accordance with aspects of the present disclosure.

FIG. 7 shows a block diagram 700 of a security manager 705 that supports authentication using key agreement in accordance with aspects of the present disclosure. The security manager 705 may be an example of aspects of a security manager 615 or a security manager 810 described herein. The security manager 705 may include an authentication interface 710, an asymmetric key component 715, a symmetric key component 720, an encryption component 725, a key agreement component 730, a random challenge component 735, an authentication component 740, a provisioning component 745, a key splitting component 750, a key transmission interface 755, a key encoding component 760, a display component 765, a QR code component 770, a client interface 775, a key storage component 780, a key erasing component 785, and a digital signature component 790. Each of these modules may communicate, directly or indirectly, with one another (e.g., via one or more buses).

The authentication interface 710 may receive, at the server and from the client, an authentication request.

The asymmetric key component 715 may generate, in response to receiving the authentication request, a short-lived asymmetric key pair on the server, the client being associated with a client public key.

In some examples, the asymmetric key component 715 may generate, based on the request, a first key pair including the client public key and a private key.

In some examples, the asymmetric key component 715 may generate an elliptic curve key pair as the short-lived asymmetric key pair including the short-lived private key and a short-lived public key based on receiving the authentication request.

The symmetric key component 720 may generate, based on receiving the authentication request, a symmetric key using the client public key and a short-lived private key of the short-lived asymmetric key pair.

In some examples, the symmetric key component 720 may generate the symmetric key using the server private key and the client public key, where the partial key agreement result is generated using the first portion of the split private key and the server public key such that the client is able to derive the symmetric key using the second portion of the split private key and a short-lived public key of the short-lived asymmetric key pair.

In some examples, the symmetric key component 720 may use an Elliptic-Curve Diffie-Hellman (ECDH) protocol to generate the symmetric key and the partial key agreement result.

The encryption component 725 may encrypt a random challenge using the symmetric key.

The key agreement component 730 may generate a partial key agreement result using a first portion of a split private key, the server having transmitted a second portion of the split private key to the client, the split private key being associated with the client public key.

The random challenge component 735 may transmit the encrypted random challenge and the partial key agreement result to the client, where the client is configured to derive the symmetric key for decrypting the random challenge using the partial key agreement result.

The authentication component 740 may authenticate the client based on receiving an indication of successful decryption of the random challenge by the client.

The provisioning component 745 may receive, at the server and from the client, a request for an authentication.

The key splitting component 750 may generate, based on the private key, the split private key including the first portion of the split private key and the second portion of the split private key.

The key transmission interface 755 may transmit, to the client, an indication of the second portion of the split private key, where the server is configured to receive the authentication request from the client based on transmitting the indication of the second portion of the split private key to the client.

The key encoding component 760 may generate an encoded version of the second portion of the split private key.

The display component 765 may cause display of the encoded version of the first portion of the split private key on a user interface of a computing device.

The QR code component 770 may generate a quick response (QR) code, where the QR code is displayed to a user on the user interface.

The client interface 775 may cause a first sub portion of the second portion of the split private key to be stored at the client.

In some examples, the client interface 775 may cause display of a second sub portion of the split private key to be displayed by the user interface.

In some examples, the client interface 775 may transmit, to a user device associated with the client and in response to the authentication request, a blinding challenge, and verify the user based at least in part on receiving an indication of the blinding challenge.

The key storage component 780 may store the first portion of the split private key in association with the client public key.

The key erasing component 785 may erase the short-lived private key from memory in response to generating the symmetric key using the short-lived private key, the erasing resulting in the respective short-lived private key being a one-time use key.

The digital signature component 790 may generate a digital signature of the encrypted random challenge using a server signing private key such that the client is able to verify the encrypted random challenge using a server signing public key.

Figure 8:
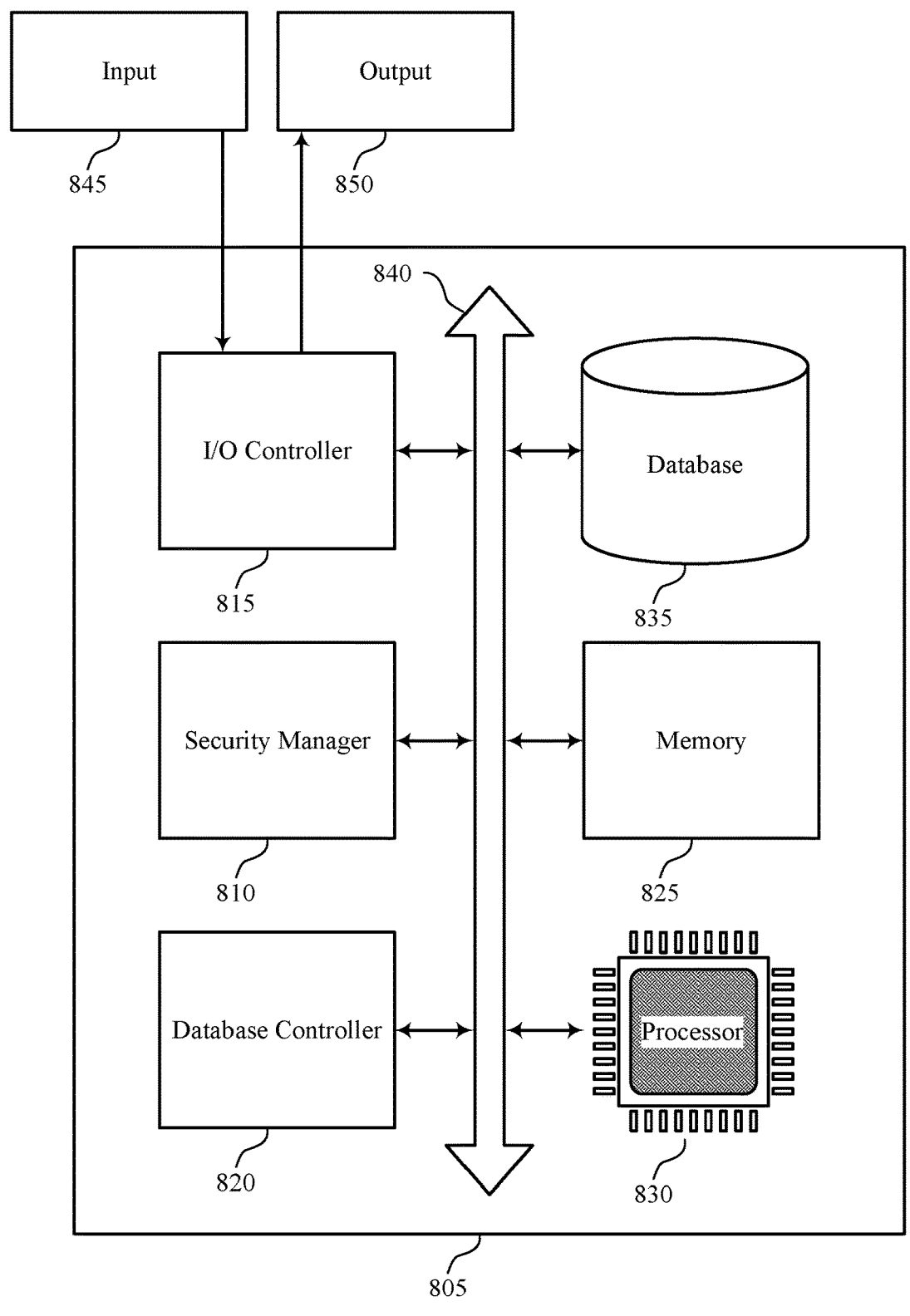
FIG. 8 shows a diagram of a system including a device that supports authentication using key agreement in accordance with aspects of the present disclosure.

FIG. 8 shows a diagram of a system 800 including a device 805 that supports authentication using key agreement in accordance with aspects of the present disclosure. The device 805 may be an example of or include the components of an application server or an apparatus 605 as described herein. The device 805 may include components for bi-directional data communications including components for transmitting and receiving communications, including a security manager 810, an I/O controller 815, a database controller 820, memory 825, a processor 830, and a database 835. These components may be in electronic communication via one or more buses (e.g., bus 840).

The security manager 810 may be an example of a security manager 615 or 705 as described herein. For example, the security manager 810 may perform any of the methods or processes described above with reference to FIGS. 6 and 7. In some cases, the security manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting authentication using key agreement).

Figure 9:
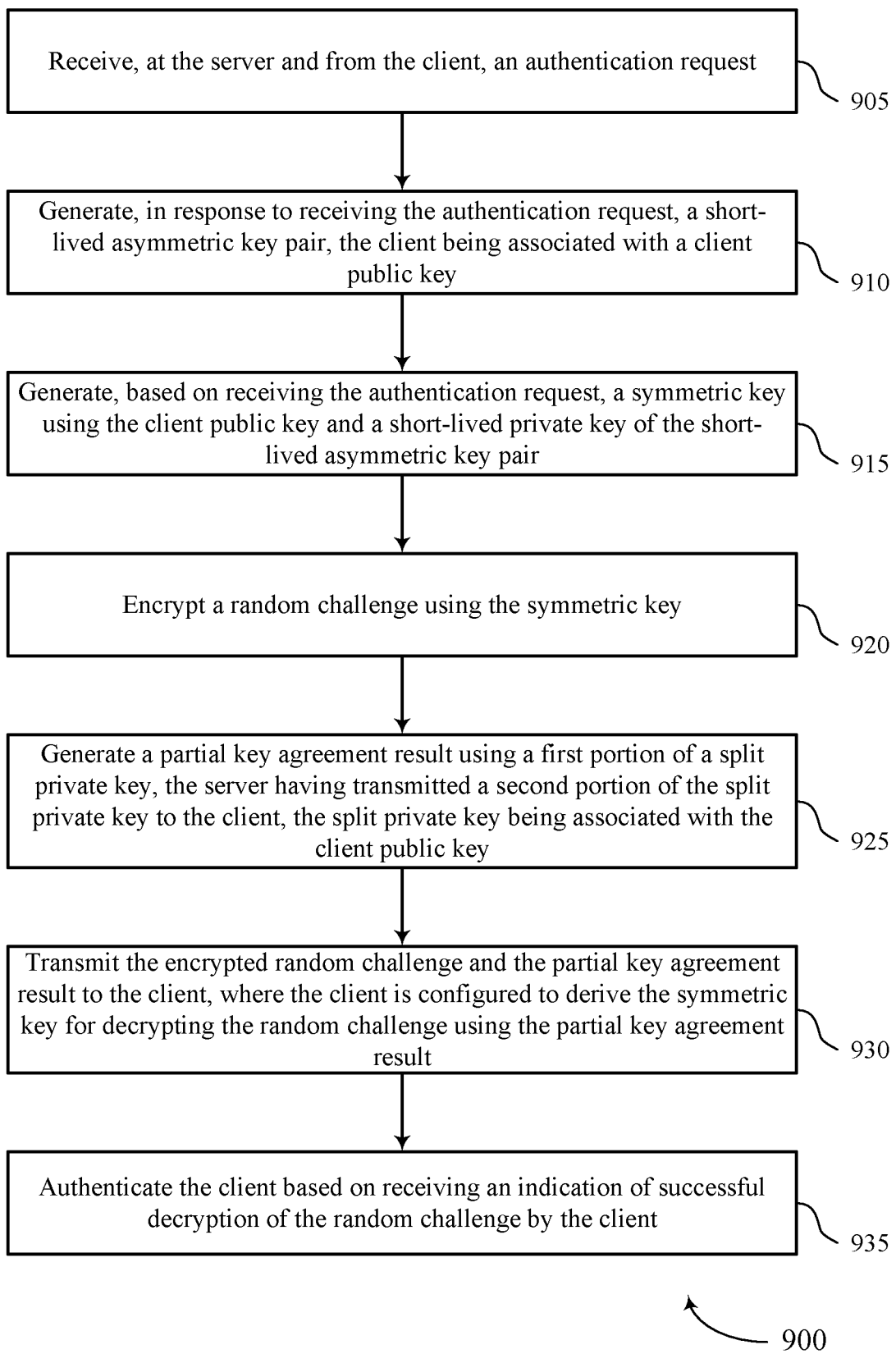
FIGS. 9 and 10 show flowcharts illustrating methods that support authentication using key agreement in accordance with aspects of the present disclosure.

FIG. 9 shows a flowchart illustrating a method 900 that supports authentication using key agreement in accordance with aspects of the present disclosure. The operations of method 900 may be implemented by an application server or its components as described herein. For example, the operations of method 900 may be performed by a security manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive, at the server and from the client, an authentication request. The operations of 905 may be performed according to the methods described herein. In some examples, aspects of the operations of 905 may be performed by an authentication interface as described with reference to FIGS. 6 through 8.

At 910, the application server may generate, in response to receiving the authentication request, a short-lived asymmetric key pair on the server, the client being associated with a client public key. The operations of 910 may be performed according to the methods described herein. In some examples, aspects of the operations of 910 may be performed by an asymmetric key component as described with reference to FIGS. 6 through 8.

At 915, the application server may generate, based on receiving the authentication request, a symmetric key using the client public key and a short-lived private key of the short-lived asymmetric key pair. The operations of 915 may be performed according to the methods described herein. In some examples, aspects of the operations of 915 may be performed by a symmetric key component as described with reference to FIGS. 6 through 8.

At 920, the application server may encrypt a random challenge using the symmetric key. The operations of 920 may be performed according to the methods described herein. In some examples, aspects of the operations of 920 may be performed by an encryption component as described with reference to FIGS. 6 through 8.

At 925, the application server may generate a partial key agreement result using a first portion of a split private key, the server having transmitted a second portion of the split private key to the client, the split private key being associated with the client public key. The operations of 925 may be performed according to the methods described herein. In some examples, aspects of the operations of 925 may be performed by a key agreement component as described with reference to FIGS. 6 through 8.

At 930, the application server may transmit the encrypted random challenge and the partial key agreement result to the client, where the client is configured to derive the symmetric key for decrypting the random challenge using the partial key agreement result. The operations of 930 may be performed according to the methods described herein. In some examples, aspects of the operations of 930 may be performed by a random challenge component as described with reference to FIGS. 6 through 8.

At 935, the application server may authenticate the client based on receiving an indication of successful decryption of the random challenge by the client. The operations of 935 may be performed according to the methods described herein. In some examples, aspects of the operations of 935 may be performed by an authentication component as described with reference to FIGS. 6 through 8.

Figure 10:
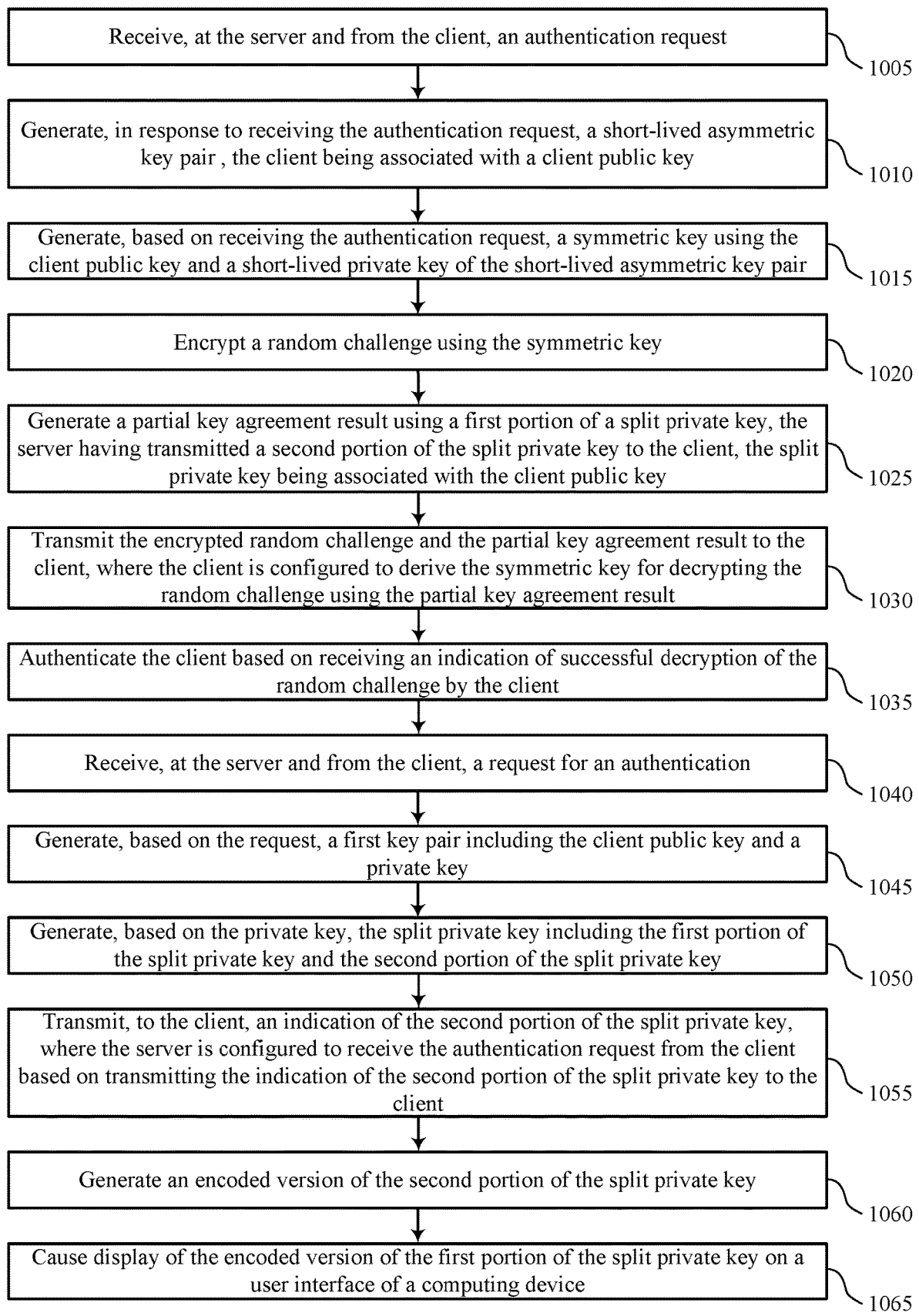

FIG. 10 shows a flowchart illustrating a method 1000 that supports authentication using key agreement in accordance with aspects of the present disclosure. The operations of method 1000 may be implemented by an application server or its components as described herein. For example, the operations of method 1000 may be performed by a security manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may receive, at the server and from the client, an authentication request. The operations of 1005 may be performed according to the methods described herein. In some examples, aspects of the operations of 1005 may be performed by an authentication interface as described with reference to FIGS. 6 through 8.

At 1010, the application server may generate, in response to receiving the authentication request, a short-lived asymmetric key pair on the server, the client being associated with a client public key. The operations of 1010 may be performed according to the methods described herein. In some examples, aspects of the operations of 1010 may be performed by an asymmetric key component as described with reference to FIGS. 6 through 8.

At 1015, the application server may generate, based on receiving the authentication request, a symmetric key using the client public key and a short-lived private key of the short-lived asymmetric key pair. The operations of 1015 may be performed according to the methods described herein. In some examples, aspects of the operations of 1015 may be performed by a symmetric key component as described with reference to FIGS. 6 through 8.

At 1020, the application server may encrypt a random challenge using the symmetric key. The operations of 1020 may be performed according to the methods described herein. In some examples, aspects of the operations of 1020 may be performed by an encryption component as described with reference to FIGS. 6 through 8.

At 1025, the application server may generate a partial key agreement result using a first portion of a split private key, the server having transmitted a second portion of the split private key to the client, the split private key being associated with the client public key. The operations of 1025 may be performed according to the methods described herein. In some examples, aspects of the operations of 1025 may be performed by a key agreement component as described with reference to FIGS. 6 through 8.

At 1030, the application server may transmit the encrypted random challenge and the partial key agreement result to the client, where the client is configured to derive the symmetric key for decrypting the random challenge using the partial key agreement result. The operations of 1030 may be performed according to the methods described herein. In some examples, aspects of the operations of 1030 may be performed by a random challenge component as described with reference to FIGS. 6 through 8.

At 1035, the application server may authenticate the client based on receiving an indication of successful decryption of the random challenge by the client. The operations of 1035 may be performed according to the methods described herein. In some examples, aspects of the operations of 1035 may be performed by an authentication component as described with reference to FIGS. 6 through 8.

At 1040, the application server may receive, at the server and from the client, a request for an authentication. The operations of 1040 may be performed according to the methods described herein. In some examples, aspects of the operations of 1040 may be performed by a provisioning component as described with reference to FIGS. 6 through 8.

At 1045, the application server may generate, based on the request, a first key pair including the client public key and a private key. The operations of 1045 may be performed according to the methods described herein. In some examples, aspects of the operations of 1045 may be performed by an asymmetric key component as described with reference to FIGS. 6 through 8.

At 1050, the application server may generate, based on the private key, the split private key including the first portion of the split private key and the second portion of the split private key. The operations of 1050 may be performed according to the methods described herein. In some examples, aspects of the operations of 1050 may be performed by a key splitting component as described with reference to FIGS. 6 through 8.

At 1055, the application server may transmit, to the client, an indication of the second portion of the split private key, where the server is configured to receive the authentication request from the client based on transmitting the indication of the second portion of the split private key to the client. The operations of 1055 may be performed according to the methods described herein. In some examples, aspects of the operations of 1055 may be performed by a key transmission interface as described with reference to FIGS. 6 through 8.

At 1060, the application server may generate an encoded version of the second portion of the split private key. The operations of 1060 may be performed according to the methods described herein. In some examples, aspects of the operations of 1060 may be performed by a key encoding component as described with reference to FIGS. 6 through 8.

At 1065, the application server may cause display of the encoded version of the first portion of the split private key on a user interface of a computing device. The operations of 1065 may be performed according to the methods described herein. In some examples, aspects of the operations of 1065 may be performed by a display component as described with reference to FIGS. 6 through 8.

A method of authentication of a client to a server is described. The method may include receiving, at the server and from the client, an authentication request, generating, in response to receiving the authentication request, a short-lived asymmetric key pair on the server, the client being associated with a client public key, generating, based on receiving the authentication request, a symmetric key using the client public key and a short-lived private key of the short-lived asymmetric key pair, encrypting a random challenge using the symmetric key, generating a partial key agreement result using a first portion of a split private key, the server having transmitted a second portion of the split private key to the client, the split private key being associated with the client public key, transmitting the encrypted random challenge and the partial key agreement result to the client, where the client is configured to derive the symmetric key for decrypting the random challenge using the partial key agreement result, and authenticating the client based on receiving an indication of successful decryption of the random challenge by the client.

An apparatus for authentication of a client to a server is described. The apparatus may include a processor, memory coupled with the processor, and instructions stored in the memory. The instructions may be executable by the processor to cause the apparatus to receive, at the server and from the client, an authentication request, generate, in response to receiving the authentication request, a short-lived asymmetric key pair on the server, the client being associated with a client public key, generate, based on receiving the authentication request, a symmetric key using the client public key and a short-lived private key of the short-lived asymmetric key pair, encrypt a random challenge using the symmetric key, generate a partial key agreement result using a first portion of a split private key, the server having transmitted a second portion of the split private key to the client, the split private key being associated with the client public key, transmit the encrypted random challenge and the partial key agreement result to the client, where the client is configured to derive the symmetric key for decrypting the random challenge using the partial key agreement result, and authenticate the client based on receiving an indication of successful decryption of the random challenge by the client.

Another apparatus for authentication of a client to a server is described. The apparatus may include means for receiving, at the server and from the client, an authentication request, generating, in response to receiving the authentication request, a short-lived asymmetric key pair on the server, the client being associated with a client public key, generating, based on receiving the authentication request, a symmetric key using the client public key and a short-lived private key of the short-lived asymmetric key pair, encrypting a random challenge using the symmetric key, generating a partial key agreement result using a first portion of a split private key, the server having transmitted a second portion of the split private key to the client, the split private key being associated with the client public key, transmitting the encrypted random challenge and the partial key agreement result to the client, where the client is configured to derive the symmetric key for decrypting the random challenge using the partial key agreement result, and authenticating the client based on receiving an indication of successful decryption of the random challenge by the client.

A non-transitory computer-readable medium storing code for authentication of a client to a server is described. The code may include instructions executable by a processor to receive, at the server and from the client, an authentication request, generate, in response to receiving the authentication request, a short-lived asymmetric key pair on the server, the client being associated with a client public key, generate, based on receiving the authentication request, a symmetric key using the client public key and a short-lived private key of the short-lived asymmetric key pair, encrypt a random challenge using the symmetric key, generate a partial key agreement result using a first portion of a split private key, the server having transmitted a second portion of the split private key to the client, the split private key being associated with the client public key, transmit the encrypted random challenge and the partial key agreement result to the client, where the client is configured to derive the symmetric key for decrypting the random challenge using the partial key agreement result, and authenticate the client based on receiving an indication of successful decryption of the random challenge by the client.

Some examples of the method, apparatuses, and non-transitory computer-readable medium described herein may further include operations, features, means, or instructions for receiving, at the server and from the client, a request for an authentication, generating, based on the request, a first key pair including the client public key and a private key, generating, based on the private key, the split private key including the first portion of the split private key and the second portion of the split private key, and transmitting, to the client, an indication of the second portion of the split private key, where the server may be configured to receive the authentication request from the client based on transmitting the indication of the second portion of the split private key to the client.

In some examples of the method, apparatuses, and non-transitory computer-readable medium described herein, transmitting the indication of the first portion of the split private key may include operations, features, means, or instructions for generating an encoded version of the second portion of the split private key, and causing display of the encoded version of the first portion of the split private key on a user interface of a computing device.

In some examples of the method, apparatuses, and non-transitory computer-readable medium described herein, generating the encoded version of the first portion of the split private key may include operations, features, means, or instructions for generating a quick response (QR) code, where the QR code may be displayed to a user on the user interface.

In some examples of the method, apparatuses, and non-transitory computer-readable medium described herein, transmitting the indication of the first portion of the split private key may include operations, features, means, or instructions for causing a first sub portion of the second portion of the split private key to be stored at the client, and causing display of a second sub portion of the split private key to be displayed by the user interface.

Some examples of the method, apparatuses, and non-transitory computer-readable medium described herein may further include operations, features, means, or instructions for storing the first portion of the split private key in association with the client public key.

Some examples of the method, apparatuses, and non-transitory computer-readable medium described herein may further include operations, features, means, or instructions for generating an elliptic curve key pair as the short-lived asymmetric key pair including the short-lived private key and a short-lived public key based on receiving the authentication request, and generating the symmetric key using the server private key and the client public key, where the partial key agreement result may be generated using the first portion of the split private key and the short-lived public key such that the client may be able to derive the symmetric key using the second portion of the split private key and the server public key.

Some examples of the method, apparatuses, and non-transitory computer-readable medium described herein may further include operations, features, means, or instructions for erasing the short-lived private key from memory in response to generating the symmetric key using the short-lived private key, the erasing resulting in the respective short-lived private key being a one-time use key.

Some examples of the method, apparatuses, and non-transitory computer-readable medium described herein may further include operations, features, means, or instructions for generating a digital signature of the encrypted random challenge using a server signing private key such that the client may be able to verify the encrypted random challenge using a server signing public key.

Some examples of the method, apparatuses, and non-transitory computer-readable medium described herein may further include operations, features, means, or instructions for transmitting, to a user device associated with the client and in response to the authentication request, a blinding challenge, and verifying a user based at least in part on receiving an indication of the blinding challenge.

Some examples of the method, apparatuses, and non-transitory computer-readable medium described herein may further include operations, features, means, or instructions for using an Elliptic-Curve Diffie-Hellman (ECDH) protocol to generate the symmetric key and the partial key agreement result.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for authentication of a client to a server, comprising:
    receiving, at the server and from the client, an authentication request;
    transmitting, based at least in part on receiving the authentication request, an encrypted random challenge and a partial key agreement result to the client, wherein the partial key agreement result is based on a first portion of a split private key, and the server having transmitted a second portion of the split private key to the client, the client being configured to derive a symmetric key for decrypting the encrypted random challenge using the partial key agreement result; and
    authenticating the client based at least in part on receiving an indication of successful decryption of the encrypted random challenge by the client.

2. The method of claim 1, further comprising:
    generating, on the server in response to receiving the authentication request, a short-lived asymmetric key pair, wherein the encrypted random challenged is encrypted based at least in part on the short-lived asymmetric key pair.

3. The method of claim 2, further comprising:
    generating, based at least in part on receiving the authentication request, a symmetric key using a client public key and a short-lived private key of the short-lived asymmetric key pair; and
    encrypting a random challenge using the symmetric key to generate the encrypted random challenge.

4. The method of claim 3, further comprising:
    erasing the short-lived private key from memory in response to generating the symmetric key using the short-lived private key, the erasing resulting in the short-lived private key being a one-time use key.

5. The method of claim 1, further comprising:
    generating the partial key agreement result using a first portion of a split private key, the server having transmitted a second portion of the split private key to the client, the split private key being associated with a client public key.

6. The method of claim 1, further comprising:
    receiving, at the server and from the client, a request for an authentication;
    generating, based at least in part on the request, a first key pair including a client public key and a private key;
    generating, based at least in part on the private key, a split private key including a first portion of the split private key and a second portion of the split private key; and
    transmitting, to the client, an indication of the second portion of the split private key, wherein the server is configured to receive the authentication request from the client based at least in part on transmitting the indication of the second portion of the split private key to the client.

7. The method of claim 6, wherein transmitting the indication of the first portion of the split private key comprises:
    generating an encoded version of the second portion of the split private key; and
    causing display of the encoded version of the first portion of the split private key on a user interface of a computing device.

8. The method of claim 7, wherein generating the encoded version of the first portion of the split private key comprises:
    generating a quick response (QR) code, wherein the QR code is displayed to a user on the user interface.

9. The method of claim 6, wherein transmitting the indication of the first portion of the split private key comprises:
    causing a first sub portion of the second portion of the split private key to be stored at the client; and
    causing display of a second sub portion of the split private key to be displayed by a user interface associated with the client.

10. The method of claim 6, further comprising:
    storing the first portion of the split private key in association with the client public key.

11. An apparatus for authentication of a client to a server, comprising:
    a processor;

memory coupled with the processor; and instructions stored in the memory and executable by the processor to cause the apparatus to:

receive, at the server and from the client, an authentication request;

transmit, based at least in part on receiving the authentication request, an encrypted random challenge and a partial key agreement result to the client, wherein the partial key agreement result is based on a first portion of a split private key, and the server having transmitted a second portion of the split private key to the client, the client being configured to derive a symmetric key for decrypting the encrypted random challenge using the partial key agreement result; and authenticate the client based at least in part on receiving an indication of successful decryption of the encrypted random challenge by the client.

12. The apparatus of claim 11, wherein the instructions are further executable by the processor to cause the apparatus to:

generate, on the server in response to receiving the authentication request, a short-lived asymmetric key pair, wherein the encrypted random challenged is encrypted based at least in part on the short-lived asymmetric key pair.

13. The apparatus of claim 12, wherein the instructions are further executable by the processor to cause the apparatus to:

generate, based at least in part on receiving the authentication request, a symmetric key using a client public key and a short-lived private key of the short-lived asymmetric key pair; and encrypt a random challenge using the symmetric key to generate the encrypted random challenge.

14. The apparatus of claim 13, wherein the instructions are further executable by the processor to cause the apparatus to:

erase the short-lived private key from memory in response to generating the symmetric key using the short-lived private key, the erasing resulting in the short-lived private key being a one-time use key.

15. The apparatus of claim 11, wherein the instructions are further executable by the processor to cause the apparatus to:

generate the partial key agreement result using a first portion of a split private key, the server having transmitted a second portion of the split private key to the client, the split private key being associated with a client public key.

16. A non-transitory computer-readable medium storing code for authentication of a client to a server, the code comprising instructions executable by a processor to:

receive, at the server and from the client, an authentication request;

transmit, based at least in part on receiving the authentication request, an encrypted random challenge and a partial key agreement result to the client, wherein the partial key agreement result is based on a first portion of a split private key, and the server having transmitted a second portion of the split private key to the client, the client being configured to derive a symmetric key for decrypting the encrypted random challenge using the partial key agreement result; and authenticate the client based at least in part on receiving an indication of successful decryption of the encrypted random challenge by the client.

17. The non-transitory computer-readable medium of claim 16, wherein the instructions are further executable by the processor to:

generate, on the server in response to receiving the authentication request, a short-lived asymmetric key pair, wherein the encrypted random challenged is encrypted based at least in part on the short-lived asymmetric key pair.

18. The non-transitory computer-readable medium of claim 17, wherein the instructions are further executable by the processor to:

generate, based at least in part on receiving the authentication request, a symmetric key using a client public key and a short-lived private key of the short-lived asymmetric key pair; and encrypt a random challenge using the symmetric key to generate the encrypted random challenge.

19. The non-transitory computer-readable medium of claim 18, wherein the instructions are further executable by the processor to:

erase the short-lived private key from memory in response to generating the symmetric key using the short-lived private key, the erasing resulting in the short-lived private key being a one-time use key.

20. The non-transitory computer-readable medium of claim 16, wherein the instructions are further executable by the processor to:

generate the partial key agreement result using a first portion of a split private key, the server having transmitted a second portion of the split private key to the client, the split private key being associated with a client public key.

* * * * *